No. 734,040. PATENTED JULY 21, 1903.
H. G. BROOKS.
WATER GAGE.
APPLICATION FILED MAR. 7, 1903.
NO MODEL.

Witnesses:

Inventor:
Henry G. Brooks.

No. 734,040. Patented July 21, 1903.

UNITED STATES PATENT OFFICE.

HENRY G. BROOKS, OF MARSHALL, MICHIGAN.

WATER-GAGE.

SPECIFICATION forming part of Letters Patent No. 734,040, dated July 21, 1903.

Application filed March 7, 1903. Serial No. 146,680. (No model.)

*To all whom it may concern:*

Be it known that I, HENRY G. BROOKS, a citizen of the United States, residing at Marshall, in the county of Calhoun and State of Michigan, have invented certain new and useful Improvements in Water-Gages; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in water-gages; and the objects of my improvements are, first, to provide a seating adapted to the fixtures now in common use; second, to provide a gage for vertical adjustment, so that one end of the glass will not be too far entered and the other not far enough, and, third, to provide a lining for the glass tube which also forms a raceway for the water and steam and also a background for the water-level. I attain these objects by the mechanism illustrated in the accompanying drawings, in which—

Figure 1:
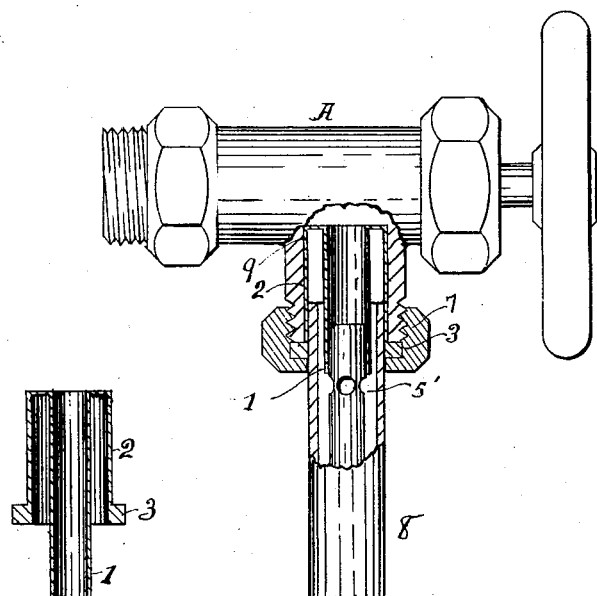
Figure 2:
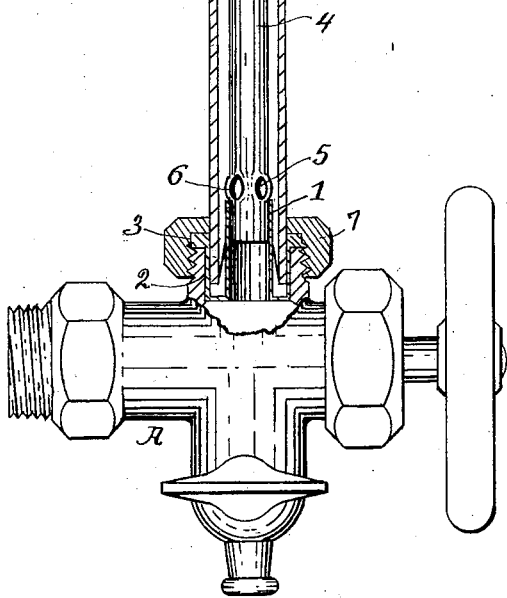

Figure 2 is a vertical view of a water-gage, partly in section, in which my improvements are shown. Fig. 1 is a sectional view of my improved seating.

Similar letters and figures refer to similar parts in both views.

In Fig. 2, A and A are fixtures now in common use, and 8 is the glass tube in which my raceway 4 is shown.

In a patent granted to me in the United States December 2, 1890, No. 442,010, I describe and claim a seating for a water-gage, one of the essential features of which was a tube extending a short distance into the end of the glass.

My present improvement consists of a cylindrical shell 2, having a shoulder 3 and the inner tube 1, extended to view beyond the packing-nut 7 to receive the end of the raceway 4. The raceway 4, Fig. 2, consists of a tube of less outer diameter than the inner diameter of the glass and of the required length to enter the extended inner tube 1 of the seating both at the top and bottom. This raceway is provided with holes 5 and 5' near the ends to permit the water and steam to enter the space between the raceway and the glass, so as to maintain in said space the level of the water in the boiler. The tube is bulged between the holes at the lower end to form a shoulder to support it, as shown at 6, Fig. 2. This raceway receives the wear incident to the motion of the water and steam and also forms a conduit for the sediment that may enter it. The construction of the shell-seating is the same for either end of the glass, except that one is about one-half the depth of the other. This difference of construction is of great advantage in placing the glass in position, the glass being inserted first in the deeper one and then brought to the bottom of the shallower. It will be noted that the glass is entered equally at each end, thus constituting a gage for setting the glass. This shell-seating can be made in sizes to meet the requirements of fixtures now in use.

Having thus described my invention, what I claim as new, and desire to secure by Letters Patent, is—

1. In combination with a glass gage-tube and fixtures, a pair of shells fitted into said fixtures, receiving the ends of said glass tube and provided with inner tubes 1 and shoulders 3, means for holding said shoulders against said fixtures and a tubular raceway fitting at its ends into the tubes 1 and arranged within the said glass tube, the said raceway being provided with openings discharging into the space within the latter substantially as set forth.

2. In combination with a tubular fixture, a shell having an inner tube 1, means for clamping said shell in said fixture, a glass gage-tube fitting detachably into said shell, and a tubular raceway, fitting into said inner tube substantially as set forth.

3. In combination with a tubular fixture, a shell having an inner tube 1 and an exterior annular shoulder 3, means engaging the said shoulder to clamp the said shell in said fixture, a glass gage-tube fitting into the said shell and a tubular raceway fitting into said inner tube 1 substantially as set forth.

4. A raceway-tube, having holes in its sides near its ends and a bulged part or shoulder in proximity thereto at one end, in combination with tubular parts which receive the said ends and on one of which the said shoulder rests, a glass gage-tube exterior to said raceway-tube and means for holding said gage-tube and tubular parts in place.

5. A fixture having a tubular screw-threaded part, in combination with a shell fitting therein, having an external shoulder and also provided with a tube 1, a clamping-screw engaging said screw-threaded part and shoulder, to hold said shell and fixture together, a raceway-tube fitting at its lower end into said tube 1, having a shoulder or enlarged part that rests thereon and provided with openings above the same, a glass gage-tube surrounding the said raceway-tube, and means for holding the said glass tube in place substantially as set forth.

In testimony whereof I affix my signature in the presence of two witnesses.

HENRY G. BROOKS.

Witnesses:
H. J. CORTRIGHT,
M. H. STARR.